US008665769B2

(12) United States Patent
Moulsley et al.

(10) Patent No.: US 8,665,769 B2
(45) Date of Patent: Mar. 4, 2014

(54) METHOD FOR SIGNALLING RESOURCES TO A RADIO STATION AND RADIO STATION THEREFOR

(75) Inventors: Timothy J. Moulsley, Caterham (GB); Matthew P. J. Baker, Canterbury (GB)

(73) Assignee: Koninklijke Philips N.V., Eindhoven (NL)

( * ) Notice: Subject to any disclaimer, the term of this patent is extended or adjusted under 35 U.S.C. 154(b) by 400 days.

(21) Appl. No.: 12/989,659

(22) PCT Filed: Apr. 21, 2009

(86) PCT No.: PCT/IB2009/051639
§ 371 (c)(1),
(2), (4) Date: Oct. 26, 2010

(87) PCT Pub. No.: WO2009/133491
PCT Pub. Date: Nov. 5, 2009

(65) Prior Publication Data
US 2011/0038300 A1 Feb. 17, 2011

(30) Foreign Application Priority Data
Apr. 30, 2008 (EP) ..................................... 08305142

(51) Int. Cl.
*H04H 20/71* (2008.01)
(52) U.S. Cl.
USPC .......................................... 370/312; 370/328

(58) Field of Classification Search
USPC .................. 370/312, 328–330, 335–348; 375/260–267, 135–136, 146–147
See application file for complete search history.

(56) References Cited

U.S. PATENT DOCUMENTS

| 6,944,881 | B1 * | 9/2005 | Vogel .............................. 725/111 |
| 7,882,233 | B2 * | 2/2011 | Epstein et al. ................. 709/226 |
| 8,400,976 | B2 * | 3/2013 | Zhang et al. ................... 370/329 |
| 2004/0082356 | A1 | 4/2004 | Walton et al. |
| 2004/0179627 | A1 * | 9/2004 | Ketchum et al. ............... 375/267 |
| 2007/0189289 | A1 * | 8/2007 | Frederiksen et al. .......... 370/390 |
| 2007/0268900 | A1 * | 11/2007 | Park et al. ...................... 370/390 |
| 2008/0101269 | A1 * | 5/2008 | Jung et al. ...................... 370/312 |
| 2011/0149824 | A1 * | 6/2011 | Tong et al. ..................... 370/312 |

FOREIGN PATENT DOCUMENTS

EP 1737176 A1 * 12/2006
JP 2006504335 A 2/2006

* cited by examiner

*Primary Examiner* — Thai Hoang

(57) ABSTRACT

The present invention relates to a method for signaling a plurality of transmission parameters for a plurality of communications between a primary station and a plurality of respective secondary stations in a multi-user MIMO mode, comprising the steps of (a) signaling the value of at least one first transmission parameter in a multicast message to at least two secondary stations, the value of the first transmission parameter being common to the respective communications corresponding to the at least two secondary stations, and (b) signaling the value of at least one second transmission parameter in a plurality of unicast messages to each secondary stations of the plurality of secondary stations.

11 Claims, 1 Drawing Sheet

METHOD FOR SIGNALLING RESOURCES TO A RADIO STATION AND RADIO STATION THEREFOR

FIELD OF THE INVENTION

The present invention relates to a method for signalling resources from a primary station to a plurality of secondary stations. This invention is, for example, relevant for any networks comprising a plurality of radio stations, and more specifically, to a mobile telecommunication network where the secondary stations are for instance able to carry out MIMO transmissions.

BACKGROUND OF THE INVENTION

In a network like a mobile telecommunication network, a primary station (like a base station in GSM or an eNode B in UMTS) indicates the transmission resources allocated to the secondary stations (like mobile stations in GSM or User Equipments in UMTS).

For instance, in current versions of the specifications for the UMTS LTE (Long Term Evolution), signalling is provided on a control channel (like the PDCCH, Physical Downlink Control Channel) transmitted from the primary station (eNB) to the secondary station (UE) to indicate the transmission resources used for data transmission between the eNB and UE.

For downlink data transmissions, each such control signalling message may typically include at least some or all of the following: Time-frequency resource allocation, Number of MIMO layers used (i.e. the number of MIMO transmission beams), Hybrid ARQ process number, Modulation and Coding Scheme (MCS) for each layer, New data indicator (NDI) for each layer, Redundancy version (RV) for each layer, Precoding information for each layer, UE identity, CRC. Usually one control signalling message is transmitted per UE per subframe.

However, for several types of transmission modes, like a Multi User Multiple Input Multiple Output (MU-MIMO) transmission mode for example, where data transmissions to a set of UEs take place in the same (or at least overlapping) time-frequency resources, the amount of overhead arising from the control signalling may therefore become large.

SUMMARY OF THE INVENTION

It is an object of the invention to propose a method for signaling the allocation of resources in an efficient manner.

It is another object of the invention to propose a method for signaling of allocation of resources reducing the interference and the overhead.

Another more specific object of one of the embodiments of the present invention is to reduce the signalling overhead for MU-MIMO systems.

To this end, according to a first aspect of the invention, a method is proposed for signaling a plurality of transmission parameters for a plurality of communications between a primary station and a plurality of respective secondary stations, comprising the steps of (a) signaling the value of at least one first transmission parameter in a multicast message to at least two secondary stations, the value of the first transmission parameter being common to the respective communications corresponding to the at least two secondary stations, and (b) signaling the value of at least one second transmission parameter in a plurality of unicast messages to each secondary station of the plurality of secondary stations.

According to another aspect of the invention, a primary station is proposed comprising means for signaling a plurality of transmission parameters for a plurality of communications between the primary station and a plurality of respective secondary stations, comprising means for signaling the value of at least one first transmission parameter in a multicast message to at least two secondary stations, the value of the first transmission parameter being common to the respective communications corresponding to the at least two secondary stations, and means for signaling the value of at least one second transmission parameter in a plurality of unicast messages to each secondary station of the plurality of secondary stations.

According to still another aspect of the invention, a secondary station is proposed comprising means for receiving signaling messages related to a plurality of transmission parameters for a plurality of communications between a primary station and a plurality of secondary stations, further comprising means for deriving the transmission parameters from a multicast message signaling the value of at least one first transmission parameter, the value of the first transmission parameter being common to the respective communications corresponding to the secondary station and at least one further secondary station, and from a unicast message signaling the value of at least one second transmission parameter.

As a consequence, all the transmission parameters and control information which are common to a plurality of secondary stations may be sent in a single multicast message. A second message can be addressed respectively to each station for completing the information of the first message.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
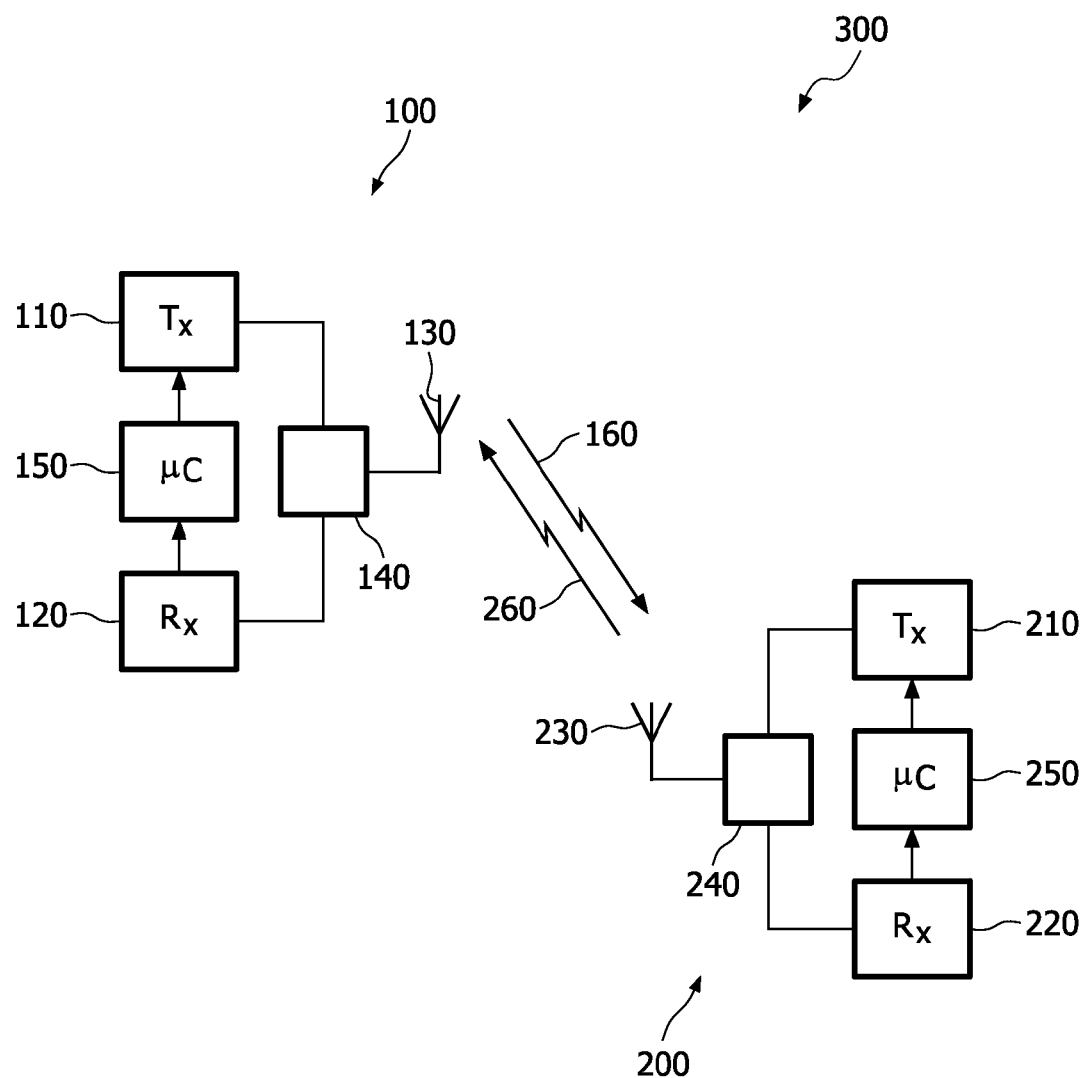
FIG. 1 is a block diagram of a system of communication in which the first aspect of the invention is implemented.

The present invention relates to a system of communication 300 as depicted on FIG. 1, comprising a primary station 100, like a base station, and at least one secondary station 200 like a mobile station.

The radio system 300 may comprise a plurality of the primary stations 100 and/or a plurality of secondary stations 200. The primary station 100 comprises a transmitter means 110 and a receiving means 120. An output of the transmitter means 110 and an input of the receiving means 120 are coupled to for example an antenna array 130 comprising a plurality of antennas by a coupling means 140, which may be for example a circulator or a changeover switch. Coupled to the transmitter means 110 and receiving means 120 is a control means 150, which may be for example a processor. The secondary station 200 comprises a transmitter means 210 and a receiving means 220. An output of the transmitter means 210 and an input of the receiving means 220 are coupled for example to an antenna array 230 comprising a plurality of antennas by a coupling means 240, which may be for example a circulator or a changeover switch. Coupled to the transmitter means 210 and receiving means 220 is a control means 250, which may be for example a processor. Transmission from the primary radio station 100 to the secondary station 200 takes place on a first channel 160 and transmission from the secondary radio station 200 to the primary station 100 takes place on a second channel 260.

A first embodiment of the invention is based on the recognition that in some implementations of MU-MIMO, restrictions may be applied which result in some components of the control signalling information being common to multiple secondary stations.

Therefore, according to the invention, when multiple secondary stations receive data transmissions in the same time-frequency resources, i.e. when MU-MIMO is used, the corresponding control signalling is split into a multicast part and a plurality of unicast parts. Control signalling information which is common to all the secondary stations receiving data transmissions in a given time-frequency resource is transmitted in the multicast part, while control signalling information which is specific to an individual secondary station is transmitted in one of the unicast parts.

In one embodiment, a restriction may be applied such that for a set of secondary stations receiving data in a given time-frequency resource in a given subframe, the exact extent of the time-frequency resources used is identical for all the secondary stations in the set in the subframe. Such a restriction has the advantage that the intra-cell interference experienced by each secondary station as a result of the simultaneous transmissions to other secondary stations could be assumed to be the same for all the data received in that subframe. Moreover, this can reduce the complexity of channel estimation and decoding.

Under the scenario of such a restriction, according to the first embodiment of the invention, the time-frequency resource allocation is signalled in the multicast part of the control signalling and the remaining information is signalled in the unicast parts. In this example, the time-frequency resource comprises a frequency and a timeslot within a larger time frame. In one example of this embodiment, the multicast part comprises a broadcast identity and a set of time-frequency resource allocations, each time-frequency resource allocation corresponding to one set of secondary stations and being associated with an index. The time frequency resource allocation comprises the specification of the subcarriers, and the time slots. Then, the respective unicast parts then contain only the index pointing to one time-frequency allocation allocated to a secondary station. An advantage is that the index requires a much smaller number of signalling bits than the full signalling of the time-frequency resource allocation. Thus, if the time-frequency resource allocations signaled in the multicast message are reused for several time slots and updated only from time to time, this permits the amount of signaling required to allocate a resource to a secondary station to be significantly reduced.

Figure 2:
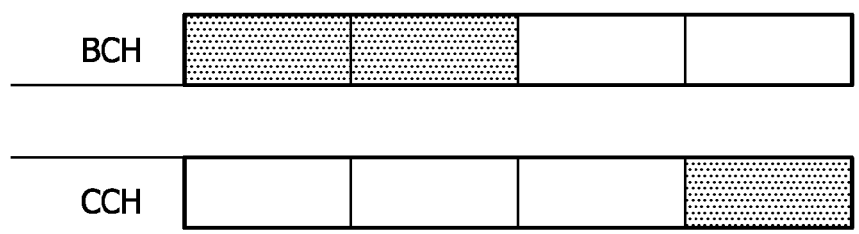
FIG. 2 is a time chart illustrating a method in accordance with the invention.

This is for instance illustrated in FIG. 2, where on a Broadcast Channel (BCH) which can be received by all the secondary stations, a time-frequency resource allocation is specified in one large message. Then, for instance on another channel, here the control channel (CCH), an index is specified to one particular secondary station, this index being representative of one set of allocation specified in the first broadcast message. In this example the two channels are different, but in a variant of this example, the message addressed to several secondary stations is a multicast message on the same control channel. In some embodiments multiple sets of secondary stations may receive transmissions in the same timeslot, with all the secondary stations in each set using a frequency resource allocation designated for that set. In such a case, the large message may comprise an indication of the same number of frequency resource allocations as secondary stations receiving transmissions in the same timeslot, each frequency resource allocation being associated with an index.

In another embodiment, part of the precoding information for each time-frequency resource allocation is indicated in the multicast part of the control signalling. The remainder of the precoding information for each secondary station is indicated in the corresponding unicast part. For example, the precoding vectors used for the transmission of data to the secondary stations in a set may be drawn from a particular matrix in a codebook, or from a predefined subset of vectors in the codebook. An indicator of the matrix or subset of vectors is then transmitted in the multicast part to the set of secondary stations, while the identity of the specific vector for each secondary station is transmitted in the corresponding unicast part, which is then sent to the secondary station.

In another embodiment of the invention, in a MU-MIMO system, the primary station transmits in a multicast message the time-frequency allocation which is common to a set of secondary stations, i.e. the time frequency block they will use for a MIMO transmission. Then, in a unicast message, the primary station specifies to each secondary station a precoding vector to be used, with which it is possible to direct the MIMO transmission beam towards the primary station.

In some embodiments, the multicast part of the control signalling is transmitted on a broadcast channel, and all the secondary stations can listen and receive this message. In other embodiments, the multicast part is transmitted with a multicast ID, monitored by a plurality of secondary stations, on the same control channel as the unicast parts. A multicast ID may be an ID referring to a group of particular secondary stations. Then, if a secondary station receives a message containing the multicast ID, it will check whether this ID corresponds to one group to whom the considered secondary station belongs. In other embodiments, the multicast part is transmitted with multiple UE IDs on the same control channel as the unicast parts.

This invention applies for instance to Multi-user MIMO mobile communication systems, such as LTE, LTE-Advanced, WiMAX or UMB.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single unit may fulfil the functions of several items recited in the claims. The mere fact that certain measures are recited in mutually different dependent claims does not indicate that a combination of these measured cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A method for signaling a plurality of transmission parameters for a plurality of communications between a primary station and a plurality of respective secondary stations wherein the transmissions to the plurality of secondary stations at least partly overlap in time and frequency and each use a different antenna or combination of antennas for transmission in a multi-user MIMO mode, the method comprising the steps of
   (a) signaling at least one first transmission parameter in a multicast message addressed to at least two secondary stations, the at least one first transmission parameter representing a resource allocation being common to respective communications corresponding to the at least two secondary stations, and
   (b) signaling at least one second transmission parameter in a unicast message to selected ones of said at least two secondary stations, each of said unicast messages being addressed to a specific one of said at least two secondary stations, said at least one second transmission being associated with said resource allocation and specific to said specific one of said at least two secondary stations.

2. The method of claim 1, wherein at step (a), the at least one first transmission parameter comprises at least one of a time slot and a frequency sub-band.

3. The method of claim 2, wherein at step (b), the at least one second transmission parameter comprises an indication of a respective beam of the MIMO transmission.

4. The method of claim 2, wherein at step (a), the at least one first transmission parameter comprises a number of beams of the MIMO transmission.

5. The method of claim 2, wherein at step (a), the at least one first transmission parameter comprises an indication of a subset of beams for the MIMO transmissions, said subset being selected from a larger set of available beams, and at step (b) each at least one second transmission parameter comprises an indication of a selected beam from the indicated subset of beams.

6. The method of claim 1, wherein the at least one first transmission parameter comprises an association with an index and wherein each at least one second transmission parameter comprises an index into said resource allocation.

7. The method of claim 1, wherein the at least one second transmission parameter comprises at least one of a modulation and coding scheme, a precoding information, an ARQ process number.

8. The method of claim 1, wherein the at least one first transmission parameter comprises a set of precoding vectors each vector being associated with a respective index and wherein the at least one second transmission parameter comprises the index.

9. The method of claim 1, further comprising step (c) of transmitting data to the plurality of secondary stations in accordance with the transmission parameters.

10. The method of claim 1, further comprising at step (a) addressing the multicast message by means of a common identity associated with the at least two secondary stations.

11. A primary station comprising means for signaling a plurality of transmission parameters for a plurality of communications between the primary station and a plurality of respective secondary stations, wherein the transmissions to the plurality of secondary stations at least partly overlap in time and frequency and each use a different antenna or combination of antennas for transmission in a multi-user MIMO mode, comprising:
   means for signaling at least one first transmission parameter in a multicast message to at least two secondary stations, the first transmission parameter representing a resource allocation being common to respective communications corresponding to the at least two secondary stations, and
   means for signaling at least one second transmission parameter in a unicast message to selected ones of said at least two secondary stations, said at least one second transmission parameter being associated with said resource allocation and specific to said specific one of said at least two secondary stations.

* * * * *